US011392547B2

(12) United States Patent
Jacob et al.

(10) Patent No.: US 11,392,547 B2
(45) Date of Patent: Jul. 19, 2022

(54) USING PREFIX-DELETE OPERATIONS FOR DATA CONTAINERS

(71) Applicant: Micron Technology, Inc., Boise, ID (US)

(72) Inventors: Jacob Mulamootil Jacob, Cedar Park, TX (US); David Boles, Austin, TX (US); Gaurav Sanjay Ramdasi, Pune (IN)

(73) Assignee: Micron Technology, Inc., Boise, ID (US)

( * ) Notice: Subject to any disclaimer, the term of this patent is extended or adjusted under 35 U.S.C. 154(b) by 87 days.

(21) Appl. No.: 16/844,556

(22) Filed: Apr. 9, 2020

(65) Prior Publication Data
US 2021/0318986 A1 Oct. 14, 2021

(51) Int. Cl.
*G06F 16/16* (2019.01)
*G06F 16/182* (2019.01)
*G06F 9/30* (2018.01)
*G06F 16/174* (2019.01)
*G06F 16/17* (2019.01)

(52) U.S. Cl.
CPC .......... *G06F 16/162* (2019.01); *G06F 9/3009* (2013.01); *G06F 16/1734* (2019.01); *G06F 16/1748* (2019.01); *G06F 16/182* (2019.01)

(58) Field of Classification Search
CPC .. G06F 16/162; G06F 16/1748; G06F 9/3009; G06F 16/182; G06F 16/1734
USPC .......................................................... 707/609
See application file for complete search history.

(56) References Cited

U.S. PATENT DOCUMENTS

| 7,996,636 | B1* | 8/2011 | Prakash | G06F 3/0619 |
| | | | | 711/170 |
| 2011/0167096 | A1 | 7/2011 | Guo et al. | |
| 2012/0059800 | A1* | 3/2012 | Guo | G06F 16/1727 |
| | | | | 707/664 |
| 2013/0275656 | A1* | 10/2013 | Talagala | G06F 12/0246 |
| | | | | 711/103 |
| 2014/0258625 | A1 | 11/2014 | Zhong et al. | |
| 2018/0225316 | A1* | 8/2018 | Boles | G06F 16/2246 |
| 2020/0142861 | A1* | 5/2020 | Wu | G06F 3/064 |

FOREIGN PATENT DOCUMENTS

WO 2014194286 A1 12/2014
WO 2017075073 A1 5/2017

OTHER PUBLICATIONS

PCT International Search Report and Written Opinion for International Application No. PCT/US2021/026281 dated Jul. 21, 2021, 8 pages.

* cited by examiner

*Primary Examiner* — Hicham Skhoun
(74) *Attorney, Agent, or Firm* — Lowenstein Sandler LLP

(57) ABSTRACT

A key-value pair comprising a key and a value associated with the key is stored in a current segment of a data container. The key comprises a segment identifier identifying the current segment. The data container comprises a plurality of segments residing on a non-volatile memory device. Responsive to determining that a size of the current segment exceeds a threshold, a new segment is added to the container. The plurality of key-value pairs having respective current segment identifiers referencing one or more least recently created segments of the data container is deleted.

17 Claims, 6 Drawing Sheets

US 11,392,547 B2

USING PREFIX-DELETE OPERATIONS FOR DATA CONTAINERS

TECHNICAL FIELD

The present disclosure generally relates to a memory sub-system, and more specifically, relates to using prefix-delete operations for data containers.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
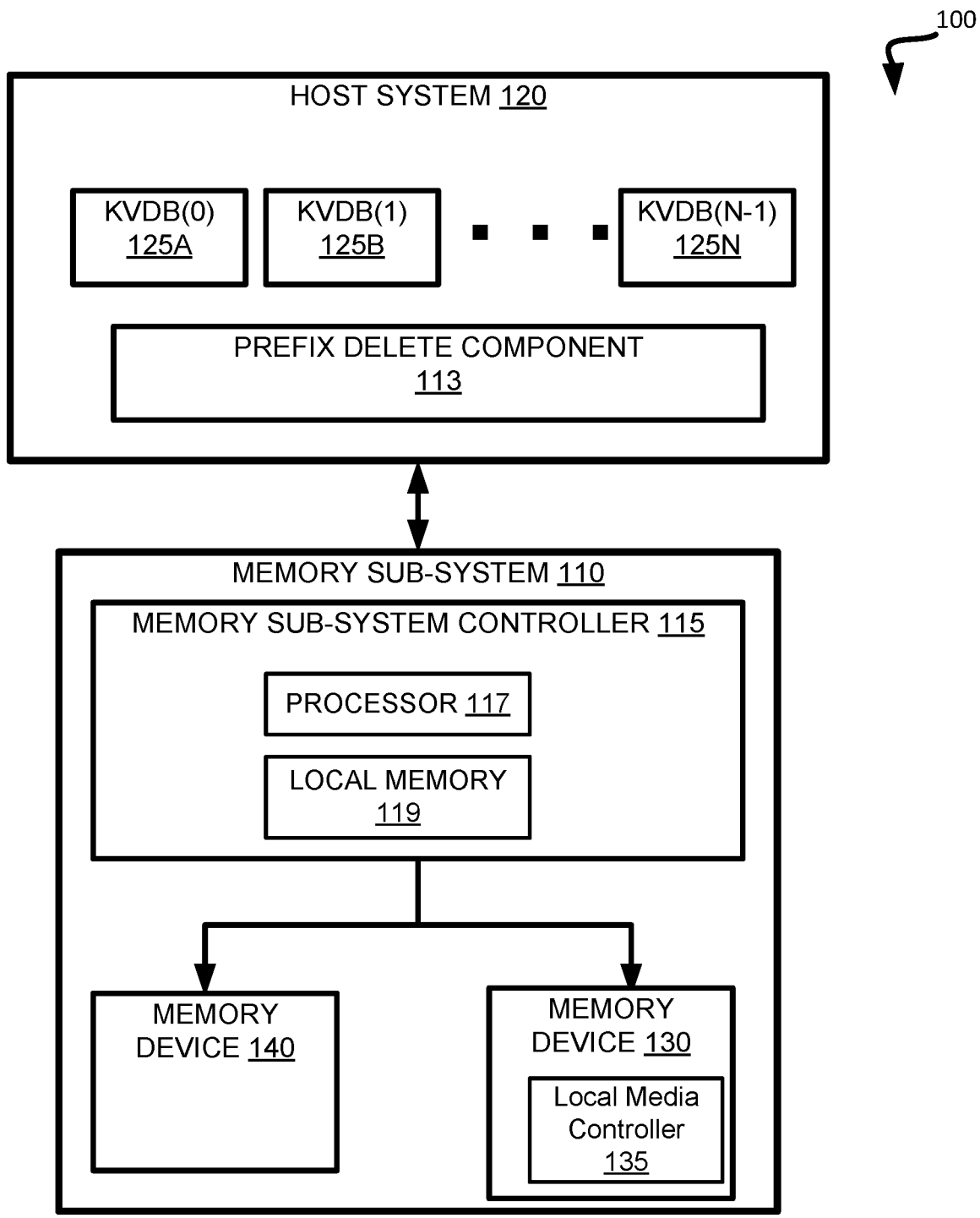
FIG. 1 illustrates an example computing system that includes a host system coupled with a memory sub-system in accordance with some embodiments of the present disclosure.

Aspects of the present disclosure are directed to implementing a prefix-delete operations for data containers. In an illustrative example, a data container can be represented by a collection of key-value sets (kvset), the collection also referred to as a key-value store (KVS). The data container can be a subset of key-values in the KVS that have a particular prefix identifying the data container (e.g., the first four bytes). Generally speaking, KVS can have many data containers, each identified by a particular prefix. In a specific embodiment (e.g., Oplog), all keys can have the same prefix, and hence they are in one data container.

Key-value data structures accept a key-value pair (i.e., including a key and a value) and are configured to respond to queries pertaining to the key. Key-value data structures may include such structures as dictionaries (e.g., maps, hash maps, etc.) in which the key is stored in a list that links (or contains) the respective value. While these data structures are useful in-memory (e.g., in main or system state memory as opposed to long-term storage), storage representations of these data structures in persistent storage (e.g., long-term on-disk storage) may be inefficient.

In some embodiments, a key-value data structure comprises a tree data structure (such as, log-structured merge-tree or LSM tree) to increase efficiency in persistent storage architecture. A tree data structure includes nodes with connections between a parent node and a child node based on a predetermined derivation of a key. The nodes include temporally ordered sequences of kvsets. The kvsets contain key-value pairs in a key-sorted structure. Kvsets are also immutable once written. The KVS tree achieves high write-throughput and improved searching by maintaining kvsets in nodes. The kvsets include sorted keys, as well as, in an example, key metrics (such as bloom filters, minimum and maximum keys, etc.), to provide efficient search. In many examples, KVS trees can improve upon the temporary storage issues of other types of tree structures by separating keys from values and merging smaller kvset collections. Additionally, the KVS trees may reduce write amplification through a variety of maintenance operations on kvsets. Further, as the kvsets in nodes are immutable, issues such as write wear on persistent storage devices (e.g., solid state devices (SSDs)) may be managed by the data structure, reducing garbage collection activities of the device itself. This has the added benefit of freeing up internal device resources (e.g., bus bandwidth, processing cycles, etc.) that result in better external drive performance (e.g., read or write speed).

While KVS trees are flexible and powerful data structures for a variety of storage tasks, greater efficiencies may be gained by combining multiple KVS trees into a KVS tree database, referred to as KVDB. Operational streams (e.g., a sequence of input/output (I/O) operations between a source (e.g., a host system) and a destination (e.g., persistent storage media)) associated with a KVDB include both user-initiated operational streams as well as administrative operational streams to maintain the KVDB. User-initiated streams encompasses I/O operations associated with applications running on the host system that need to access data in the KVDB. Administrative operational streams can include I/O operations that are part of internal maintenance-related operations periodically run by the system administrator (manually or automatically) in order to efficiently organize the data structure within a KVDB.

Without proper internal maintenance, the shape (i.e. the hierarchy between different nodes) of the tree data structure in a KVDB becomes sub-optimal, and it can take longer to complete a user-initiated operation, i.e. the latency of a user-initiated operation can be unacceptably high, which in turn negatively impacts the quality of service that the persistent storage architecture can deliver to the user.

Aspects of the present disclosure address the above-referenced and other deficiencies by proposing a prefix-delete mechanism described here, which is a faster way of deleting multiple keys (could be a large number of keys) with one simple write of a "tombstone" (described in detail below), in contrast to iterating through the keys and deleting key-values one by one. Since the keys are grouped into chunks with common identifiers as they are added, the keys can also be deleted simultaneously in one operation. Therefore, response time to users' queries is significantly improved.

In some implementations, a data container may include multiple buckets of data ("data segments", also sometimes called "data blocks" or simply "blocks") residing on a non-volatile memory device and storing data records represented by key-value pairs. Each key includes a container identifier (also referred to as a "prefix"), a data segment identifier, and a record identifier. As data records are written into the container, the data segment identifier is incremented when the size of the data segment approaches its maximum value. That data segment is then frozen and a new data segment gets added to the data container.

A background thread, which is responsible for maintaining the size of the data container, periodically examines the size (i.e., the number of data segments) of the data container, and removes one or more least recently created data segments responsive to determining that the size of the data container exceeds a certain threshold value (e.g., a certain number of data segments), thus effectively limiting the size of the data container. The background thread performs prefix-delete operations to remove the data records whose keys reference the least recently created data segment. The prefix-delete operation involves storing, in the data container, a prefix-delete tombstone referencing the least recently created data segment of the data container. The actual keys identified by the prefix-delete tombstone are then garbage-collected asynchronously by a compaction thread.

Thus, the systems and methods of the present disclosure improve the efficiency of data storing and retrieval operations by implementing the prefix-delete operations that is faster and has low latency, since multiple keys are deleted in a single operation by writing a single tombstone. In this approach, the data container size is limited by a specified threshold value, as described in more detail herein below.

FIG. 1 illustrates an example computing system 100 that includes a memory sub-system 110 in accordance with some embodiments of the present disclosure. In general, a host system can utilize a memory sub-system that includes one or more memory components, such as memory devices that store data. The host system can provide data to be stored at the memory sub-system and can request data to be retrieved from the memory sub-system.

The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. The host system 120 includes one or more instances of KVDBs 125A to 125N.

In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and a cross-point array of non-volatile memory cells.

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA) namespace) and a physical address and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The host system 120 can additionally includes a prefix-delete component 113 that can be used to facilitate prefix-delete operations for the KVDBs 125A-N in the host system 120. In some implementations memory sub-system 110 can include at least a portion of the KVDBs 125A-N and the prefix-delete component can partially reside in the memory sub-system controller 115. For example, the memory sub-system controller 115 can include a processor 117 (processing device) configured to execute instructions stored in local memory 119 for performing the operations described herein. In some embodiments, the prefix-delete component 113 is part of an application, or an operating system. Further details with regards to the operations of the prefix-delete component 113 are described below.

Figure 2:
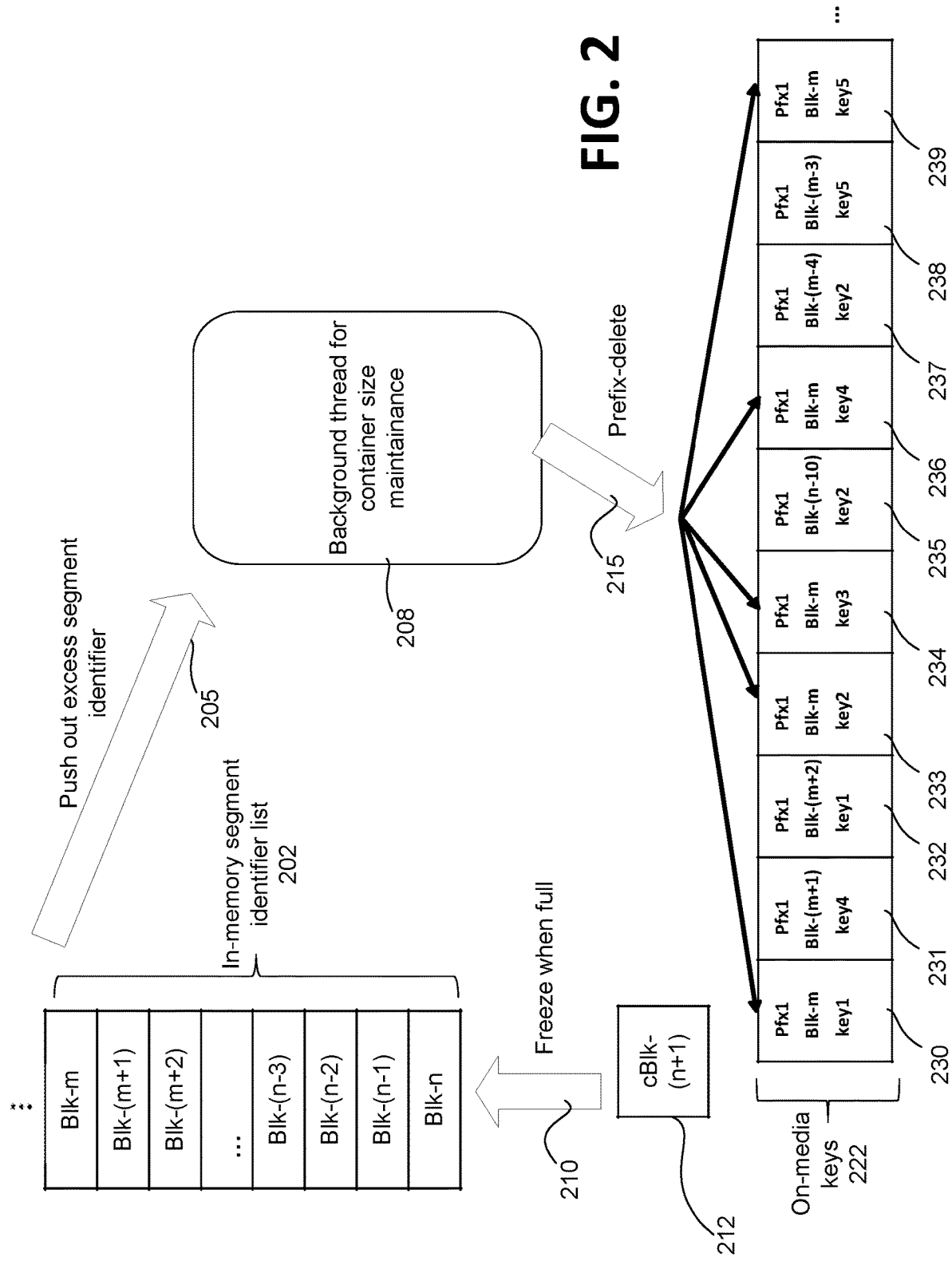
FIG. 2 schematically illustrates maintaining a capped size for a data container using a prefix-delete operation, in accordance with some embodiments of the present disclosure.

FIG. 2 schematically illustrates maintaining a capped size for a data container using a prefix-delete operation, in accordance with some embodiments of the present disclosure. When new records are added to persistent media (such as non-volatile memory device 130), a segment descriptor list 202 residing in-memory (e.g., residing in volatile local memory 119 or 140) can be updated by adding a current segment descriptor 212, shown as cBlk-(n+1). Segment descriptor list 202 comprises a description of plurality of segments, shown as Blk-m, Blk-(m+1), . . . Blk-n, (where (n−m) can be a predetermined number) of the data container in the persistent media. Blk-m is a candidate for push-out and prefix-delete, as described below in further detail below. Each of the segments of the data container can have approximately equal size. The maximum permissible size of a data container is predetermined, for example, by fixing the number of segments in a data container and fixing size of each segment. If the current segment descriptor 212, shown as cBlk-(n+1) indicates that adding the new record (e.g., key-value pair) exceeds the predetermined maximum permissible size for the data segment, then the segment is frozen (operation indicated by the arrow 210), the current segment descriptor 212 is added to the segment descriptor list, and is initialized. In one embodiment, a background thread 208 for container size maintenance periodically examines the number of segment descriptors in list 202. If the number of segment descriptors exceeds the predetermined fixed number, the background thread "pops" (i.e. pushes out) the excess segment descriptor (operation indicated by the arrow 205). For each excess segment, the background thread 208 issues a prefix-delete command (indicated by the arrow 215) to the media.

On-media keys 222 (without showing the corresponding values, for simplicity) are shown as the segments 230, 231, . . . 238. Note that the segments can store different keys (e.g., key 1, key 2, key 3, key 4, key 5), but have the segment has the same prefix identifier (e.g., Pfx1+block id) to facilitate batch delete of records via a prefix-delete command 215.

Figure 3:
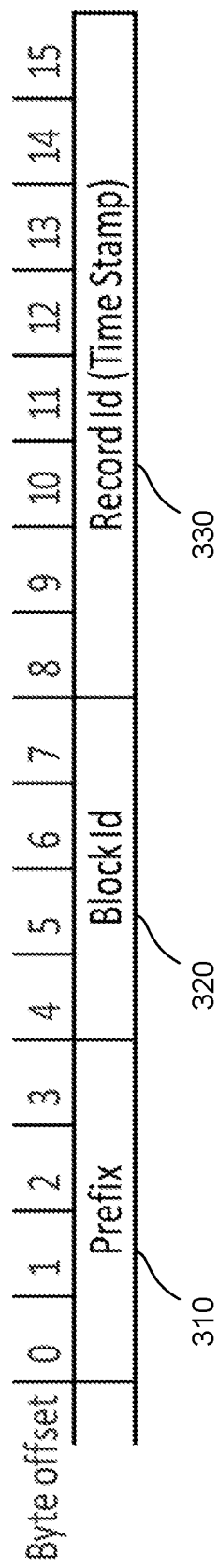
FIG. 3 illustrates a structured key format that enables the prefix-delete operation, in accordance with some embodiments of the present disclosure.

FIG. 3 illustrates a structured key format that enables the prefix-delete operation, in accordance with some embodiments of the present disclosure. Each key includes a container identifier (also referred to as a "prefix") portion 310, a data segment identifier (also referred to as a "segment ID" or "Block ID") portion 320, and a record identifier portion 330. In the particular example shown in FIG. 3, the record identifier portion 330 is referred to as "Record Id (Time Stamp)" for a particular type of record based on temporal signature (e.g. a time series with corresponding values against their time stamps), but persons skilled in the art would appreciate that record identifier portion 330 can indicate other types of records not involving time stamp. The prefix 310 and the block ID 320 can be realized by offsetting the record Id 330 by a predetermined length of bytes. For example, the prefix can be a 4-Byte string, as shown in FIG. 3. The block ID 310 may be another 4-Byte string. Note that the length of the prefix byte string and the block ID byte string does not have to be equal. Also, the length of the string may vary based on user definition.

Referring back to the example illustrated in FIG. 2, if the segment descriptor for the excess segment that is popped out in operation 205 is Blk-m, the prefix-delete command 215 would delete the records of all the segments with segment descriptor Blk-m (segments 230, 233, 234, 236 and 239) simultaneously, irrespective of the variation in the keys. This operation is elaborated more with the help of flowcharts 400 and 500 below.

Figure 4:
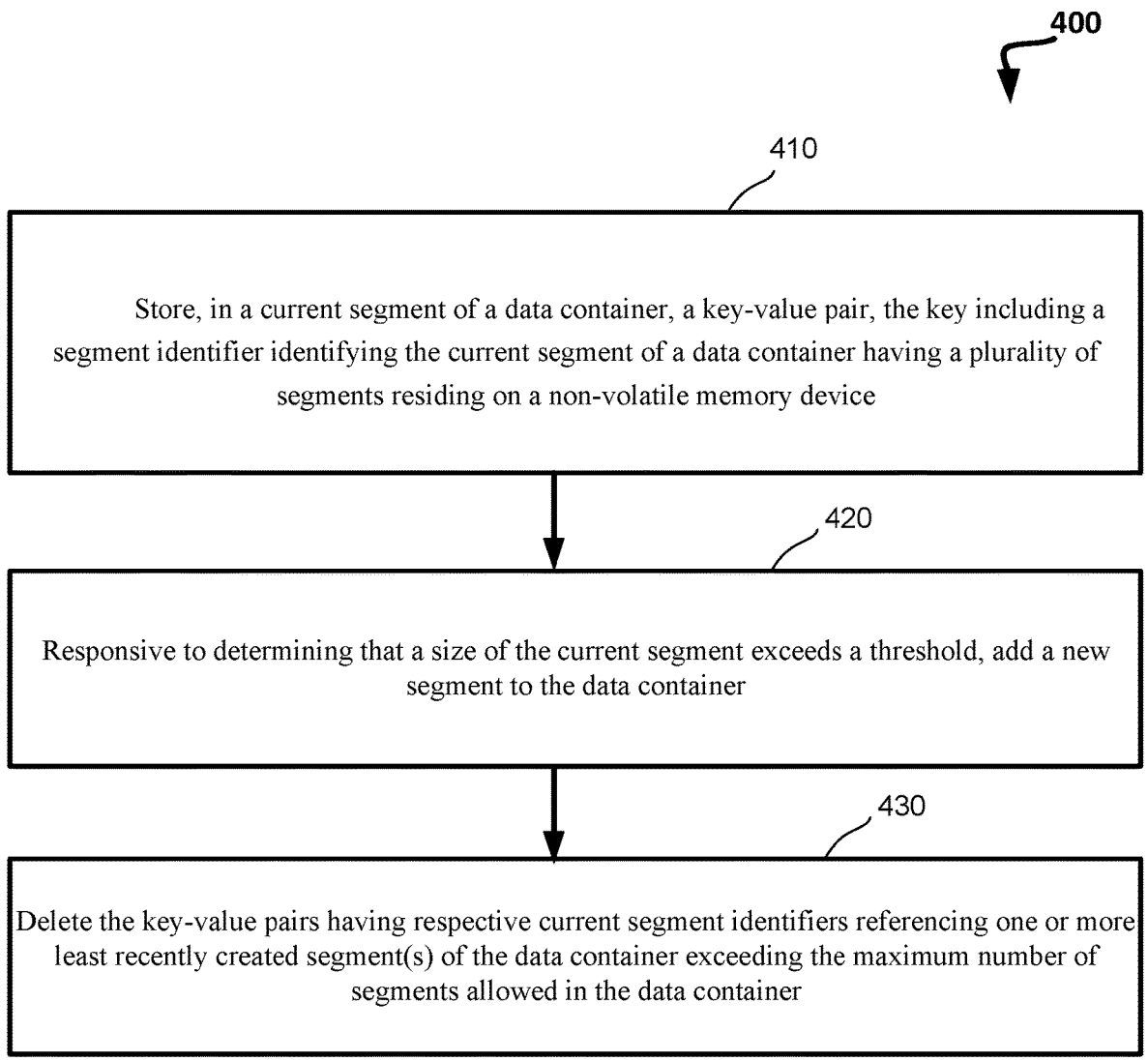
FIG. 4 illustrates a flow diagram of an example method of maintaining a data container size fixed, in accordance with some embodiments of the present disclosure.

FIG. 4 is a flow diagram of an example method 400 of maintaining a data container size fixed, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 can be performed by prefix-delete component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, a processing device stores a key-value pair in a current segment of a data container. Each key-value pair includes a key and a value associated with the key. The key includes a segment identifier identifying the current segment (e.g., Block ID 320 in FIG. 3) of the data container. The data container includes a plurality of segments residing on a non-volatile memory device, such as on the media. An example of data container segments is shown in FIG. 2 (segments 230-239). The key also includes a container ID prefix portion 310 and a record ID 330, as shown in FIG. 3. For the prefix delete operation, the prefix identifier used is <container ID prefix portion>+<segment ID>, (e.g., 310+ 320, where the '+' sign denotes concatenation.)

At operation 420, responsive to determining that a threshold for the container is exceeded, the processing device adds a new segment to the container. As described above, the threshold for the container can be predetermined by a user. From the constraint of maximum size of the container, two thresholds can be derived—the maximum size of the segment, and a maximum number of segments. In a non-limiting example, the maximum number of segments can be set to 100. For example, in the list 202 can be set to have a maximum of 100 entries. Any other number can be set as the threshold too.

At operation 430, the processing device deletes the key-value pairs having respective current segment identifiers referencing a least recently created segment of the data container. In other words, the oldest segments are identified by a background thread that maintains the container size, and are deleted from the media by a prefix-delete operation, as described below.

Figure 5:
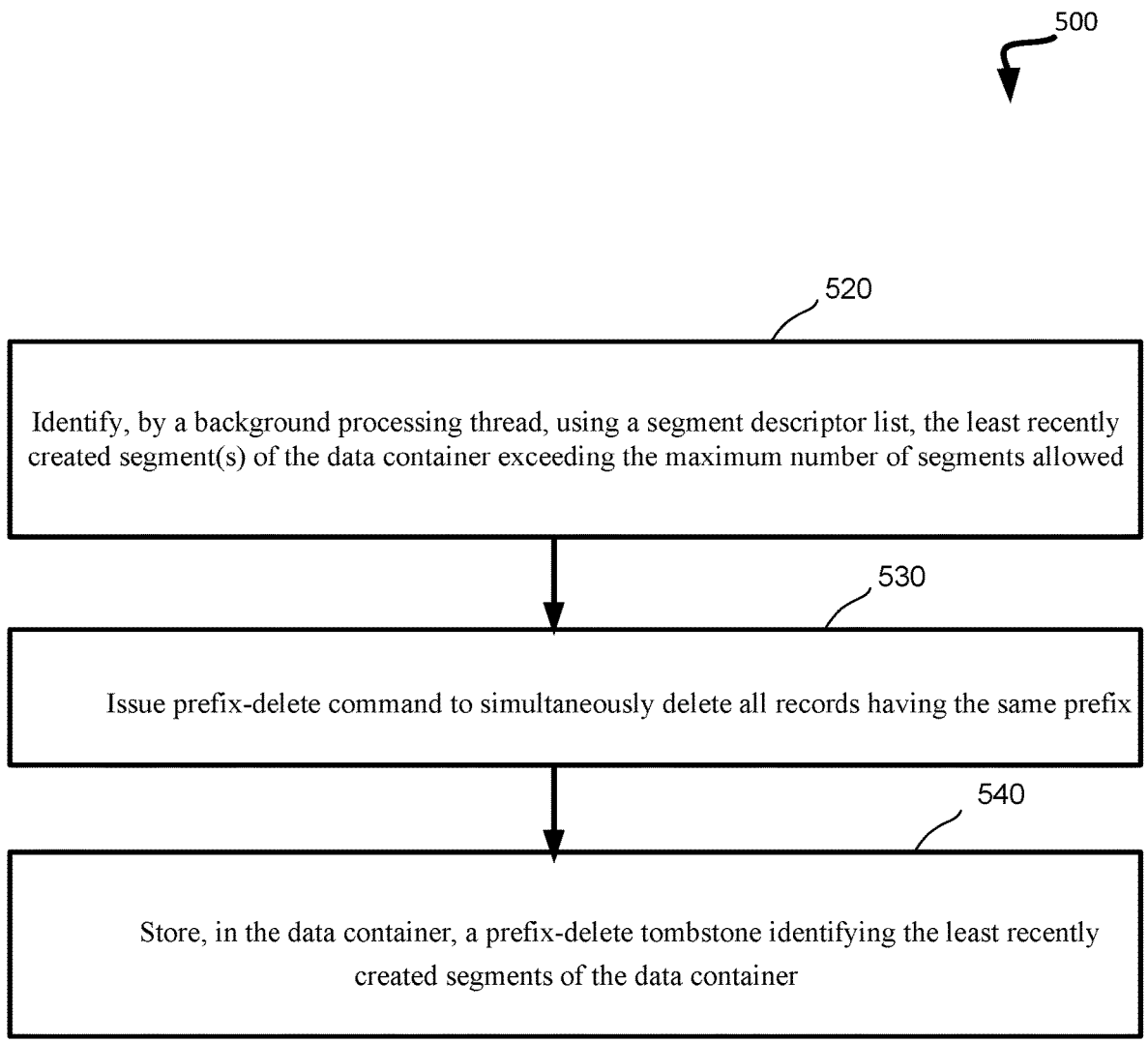
FIG. 5 is a flow diagram of an example method of performing a prefix-delete operation by a background thread for maintaining a data container size fixed, in accordance with some embodiments of the present disclosure.

FIG. 5 is a flow diagram of an example method 500 of performing a prefix-delete operation by a background thread for maintaining a data container size fixed, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 can be performed by the prefix-delete component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 520, a background processing thread identifies the least recently created segment of the data container, using the segment descriptor list. The segment descriptor list includes respective identifiers of the data segments in the data container.

At operation 530, the background processing thread issues a prefix-delete command to simultaneously delete all records having the same prefix identifier, e.g., container id concatenated with segment id. This parallel prefix-deletion operation is faster than the conventional range delete operation. The deleted keys are garbage collected during a subsequent maintenance operation by a compaction thread. The garbage collection can occur asynchronously with respect to addition of a new data segment.

At operation 540, a processing device stores a prefix-delete tombstone in the data container. The tombstone is a special marker that identifies the least recently created (i.e. the oldest) segments of the data container.

Figure 6:
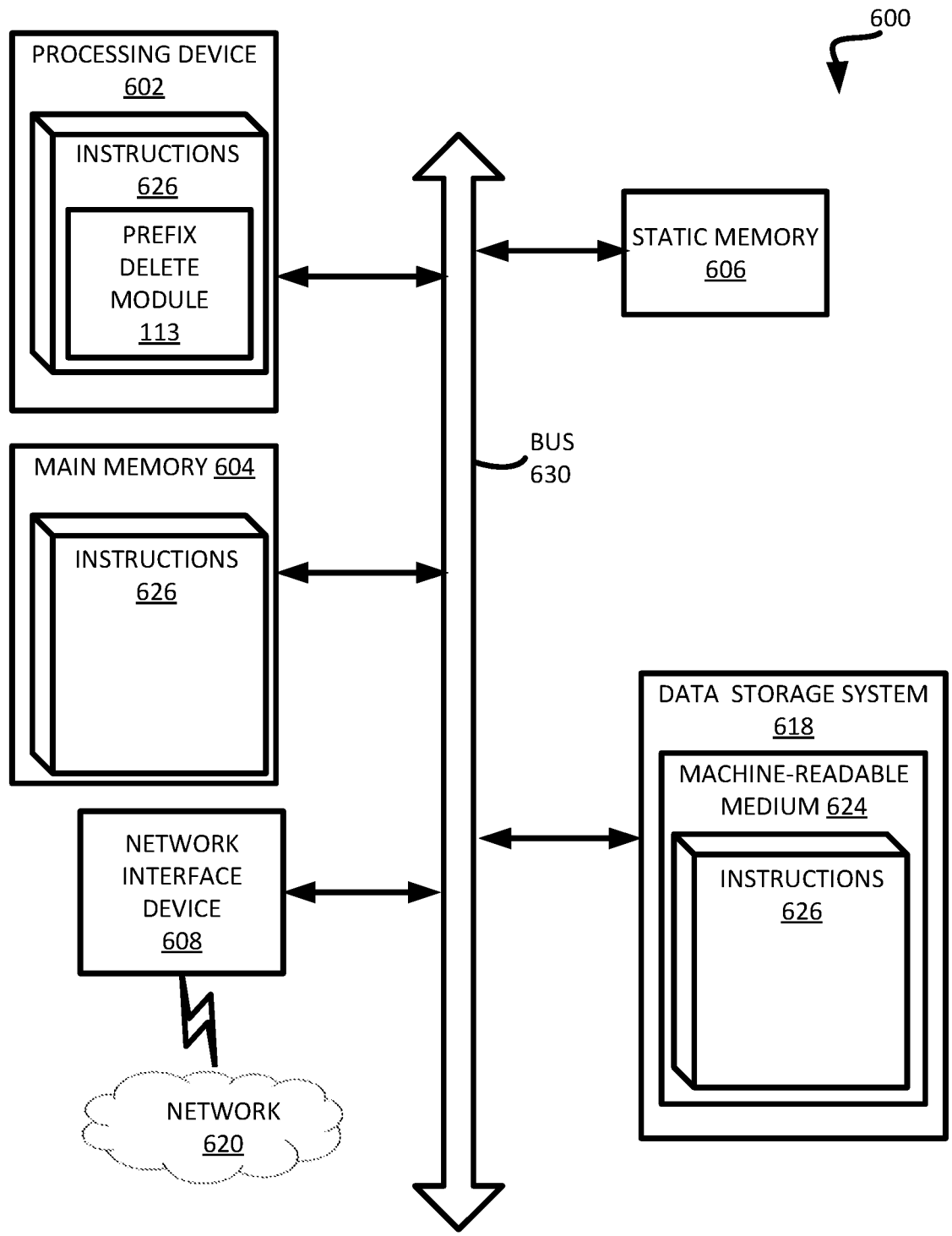
FIG. 6 is a block diagram of an example computer system in which implementations of the present disclosure can operate.

FIG. 6 illustrates an example machine of a computer system 600 within which a set of instructions, for causing the machine to perform any one or more of the methodologies discussed herein, can be executed. For example, the computer system 600 can correspond to a host system (e.g., the host system 120 of FIG. 1) that includes, is coupled to, or utilizes a memory sub-system (e.g., the host system 110 of FIG. 1) or can be used to perform the operations of a controller (e.g., to execute an operating system to perform operations corresponding to the prefix-delete component 113 of FIG. 1). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device can be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620. The data storage device 618 can include a machine-readable storage medium 624 (also known as a computer-readable medium) on which is stored one or more sets of instructions or software 626 embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage device 618, and/or main memory 604 can correspond to the memory sub-system 110 of FIG. 1.

In one implementation, the instructions 626 include instructions to implement functionality corresponding to a specific component (e.g., Prefix-delete component 113 of FIG. 1). While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "servicing" or "issuing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus can be specially constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method, comprising:
   storing, by a processing device, in a data container comprising a plurality of segments residing on a memory device, a key-value pair comprising a key and a value associated with the key, wherein the key comprises a prefix identifying the data container, a segment identifier identifying a current segment of the data container, and a record identifier including a timestamp identifying a data record;
   responsive to determining that a size of the current segment exceeds a threshold, adding a new segment to the data container; and
   deleting a plurality of key-value pairs having respective current segment identifiers referencing one or more least recently created segments of the data container exceeding a maximum number of segments.

2. The method of claim 1, wherein deleting the plurality of key-value pairs is performed by a background processing thread.

3. The method of claim 1, wherein deleting the plurality of key-value pairs further comprises:
   storing, in the data container, a prefix-delete tombstone identifying the one or more least recently created segments of the data container.

4. The method of claim 1, wherein the prefix comprises a string of bytes of a predetermined length.

5. The method of claim 1, wherein deleting the plurality of key-value pairs further comprises:
   identifying, using a segment descriptor list residing in a volatile memory, the least recently created segment of the data container, wherein the segment descriptor list comprises identifiers of the plurality of segments that comprises the data container.

6. The method of claim 5, wherein each segment identifier comprises a string of bytes of a predetermined length.

7. A system comprising:
   a memory device; and
   a processing device, operatively coupled to the memory device, to perform operations comprising:
   storing in a data container comprising a plurality of segments residing on the memory device, a key-value pair comprising a key and a value associated with the key, wherein the key comprises a prefix identifying the data container, a segment identifier identifying a current segment of the data container, and a record identifier including a timestamp identifying a data record;
   responsive to determining that a size of the current segment exceeds a threshold, adding a new segment to the data container; and
   deleting a plurality of key-value pairs having respective current segment identifiers referencing one or more least recently created segments of the data container.

8. The system of claim 7, wherein deleting the plurality of key-value pairs is performed by a background processing thread.

9. The system of claim 7, wherein deleting the plurality of key-value pairs further comprises:
   storing, in the data container, a prefix-delete tombstone identifying the least recently created segment of the data container.

10. The system of claim 7, wherein the prefix comprises a string of bytes of a predetermined length.

11. The system of claim 7, wherein deleting the plurality of key-value pairs further comprises:
    identifying, using a segment descriptor list residing in a volatile memory, the least recently created segment of the data container, wherein the segment descriptor list comprises identifiers of the plurality of segments that comprises the data container.

12. The system of claim 11, wherein each segment identifier comprises a string of bytes of a predetermined length.

13. A non-transitory computer readable medium comprising instructions, which when executed by a processing device, cause the processing device to perform operations comprising:
    storing, in a data container comprising a plurality of segments residing on a non-volatile memory device, a key-value pair comprising a key and a value associated with the key, wherein the key comprises a prefix identifying the data container, a segment identifier identifying a current segment of the data container, and a record identifier including a timestamp identifying a data record;
    responsive to determining that a size of the current segment exceeds a threshold size, adding a new segment to the data container; and
    deleting a plurality of key-value pairs having respective current segment identifiers referencing one or more least recently created segments of the data container exceeding a maximum number of segments.

14. The non-transitory computer readable medium of claim 13, wherein deleting the plurality of key-value pairs is performed by a background processing thread.

15. The non-transitory computer readable medium of claim 13, wherein deleting the plurality of key-value pairs further comprises:
    storing, in the data container, a prefix-delete tombstone identifying the least recently created segments of the data container.

16. The non-transitory computer readable medium of claim 14, wherein the prefix comprises a string of bytes of a predetermined length.

17. The non-transitory computer readable medium of claim 13, wherein deleting the plurality of key-value pairs further comprises:
    identifying, using a segment descriptor list residing in a volatile memory, the least recently created segment of the data container, wherein the segment descriptor list comprises identifiers of the plurality of segments that comprises the data container.

* * * * *